June 16, 1931.  W. HERDLING  1,810,765

SAND SPRAYING DEVICE FOR MOTOR VEHICLES, ESPECIALLY MOTOR CARS

Filed May 13, 1930

Inventor:
Wilhelm Herdling

Patented June 16, 1931

1,810,765

UNITED STATES PATENT OFFICE

WILHELM HERDLING, OF WEHEN, GERMANY

SAND SPRAYING DEVICE FOR MOTOR VEHICLES, ESPECIALLY MOTOR CARS

Application filed May 13, 1930, Serial No. 452,055, and in Germany March 29, 1930.

This invention relates to a sand spraying device for motor vehicles, especially motor cars, designed to enable the discharge of spraying material, for example sand and the like, as required in the event of slippery or frozen roads. The arrangement of the sand spraying boxes inside the car takes up room and is unpractical, as the distance to the discharge opening is too long and the drop is too low. The fitting of interchangeable boxes for spraying material on, in or below the running platform step is often not desirable on private cars, on account of unpleasing appearance. Notwithstanding the urgent necessity to fit motor cars with sand spraying devices nothing has been done up to the present time owing to the difficulty of accommodating the devices on the cars.

The disadvantages hitherto existing are overcome according to the invention, in that the mudguards of the car are provided with double walls, forming containers for the spraying material. Consequently these latter are absolutely invisible, do not take up any room and a considerable drop for the spraying material is obtained.

An embodiment of the invention is illustrated by way of example in the accompanying drawings in which.

Figure 1:
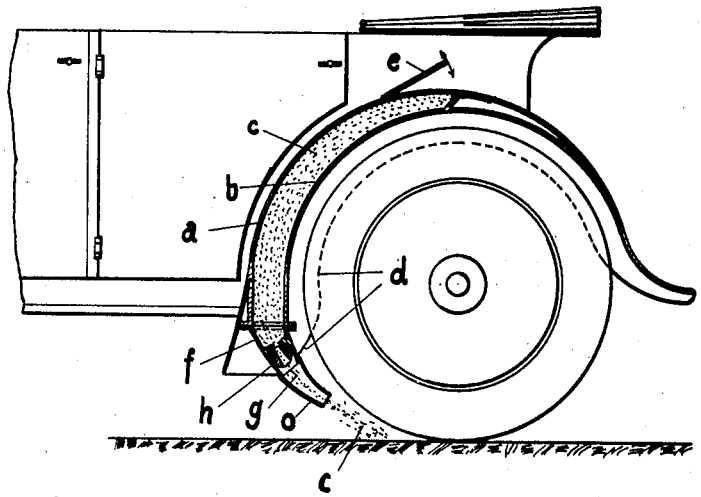
Fig. 1 shows the mudguard of a rear wheel in section.
Figure 2:
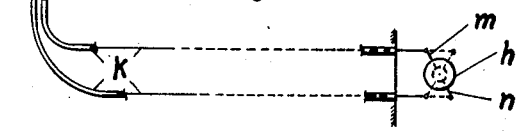
Fig. 2 is a diagrammatic view of the distant control of the discharge opening from the driver's seat by means of Bowden cable.
Figure 3:
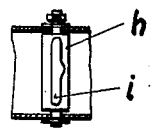
Fig. 3 is a top plan view of the element regulating the discharge opening.

The mudguard has two walls $a$, $b$ so that a closed compartment for accommodating the spraying material $c$ is formed. Owing to the bent over side parts $d$, which extend partly over the rubber tire, the container for the spraying material is entirely concealed and invisible from the outer side. The charging is effected through a door, flap $e$, conveyer worm or the like, arranged in the upper wall. Dry sifted sand is preferably used as spraying material, stored at the service stations and filled in as required. The discharge of the spraying material $c$ is preferably arranged in a separate mouthpiece $f$, which is removably flanged on the container. On removing the mouthpiece $f$, the aperture produced is closed by a cover. The mouthpiece is slightly tapered towards its lower end to form a slot opening $g$, in which the element for regulating the discharge of the spraying material is arranged. This element may be a register, flap or rotatable shaft $h$, as shown, which is provided with a discharge slot $i$ and through the setting of which the discharge is closed or more or less opened. The mouthpiece $f$ may also terminate at the lower end into one or more nozzles, which are then maintained in open or closed condition by means of resilient flaps. The adjustment of the element regulating the discharge of the spraying material, for example of the shaft $h$, is effected from the driver's seat by any suitable distant control, such as rod system or Bowden cable, which act upon a double lever $m$, $n$ of the shaft $h$. In order to reliably bring the spraying material to in front of the wheel in question, an elastic guiding element $o$, made of leather or rubber, extends from the mouthpiece $f$.

I claim:

A sand spraying device for motor vehicles, especially for motor cars adapted to be operated from the driver's seat, comprising in combination the mudguards of the car wheels having a double wall adapted to form a chute for the spraying material, a charging flap on the upper part of the outer one of said walls, and a mouthpiece detachably flanged on the lower end of said chute adapted to regulate the discharge of the spraying material.

In testimony whereof I affix my signature.

WILHELM HERDLING.